Feb. 6, 1962 P. G. CATH 3,020,348

SIGNALING CIRCUITS

Filed Oct. 31, 1958 2 Sheets-Sheet 1

INVENTOR
P. G. CATH
BY
[signature]
ATTORNEY

Feb. 6, 1962 P. G. CATH 3,020,348

SIGNALING CIRCUITS

Filed Oct. 31, 1958 2 Sheets-Sheet 2

INVENTOR
P. G. CATH
BY R. O. Nimz
ATTORNEY 3,020,348
SIGNALING CIRCUITS
Pieter G. Cath, Ann Arbor, Mich., assignor to Bell Telephone Laboratories Incorporated, New York, N.Y., a corporation of New York
Filed Oct. 31, 1958, Ser. No. 770,996
14 Claims. (Cl. 179—6.3)

This invention relates to signaling and control systems and, in particular, to remote control systems.

Although the invention is not limited in its application by the type of equipment being controlled, it has particular utility when applied to the control of coin collectors such as those typically found in pay telephone stations and hence will be described in such an application.

Coin collectors have, for many years, employed electromechanical devices for controlling deposits and refunds. Such devices, requiring relatively large valued currents, have usually been controlled from the central office by direct current signals. With the advent of electronic telephone systems, which to a large extent employ solid state devices and low valued line currents, there have been proposed compatible coin collectors which likewise employ electronic devices. It has been recognized that such systems do not lend themselves particularly well to direct current control signals and that greater efficiency and economy may be realized by employing low valued alternating currents for signaling. One such signaling system is disclosed in the copending application of E. R. Andregg, Serial No. 752,371, filed July 31, 1958, and assigned to applicant's assignee.

In telephone systems, however, control signals are usually transmitted over the same medium as the voice signals. The problem of protection against false operation is therefore made more difficult by the use of an alternating current control signal, which, of necessity, usually lies in the voice frequency range, since voice synthesis of the control signal will result in false operation. Further, where the signal controls the refund of coins at pay telephone stations, the problem is not merely statistical; deliberate attempts to secure illegal refunds are to be expected. It is, therefore, necessary to provide protection not only against random noise and statistical interference, but also against deliberate imitation of the control signal by voice or otherwise.

It is, therefore, an object of the present invention to render the performance of a remotely controlled function or device substantially immune to both random and intentional interference.

More particularly, it is an object of the present invention to prevent false operation of a device connected to a speech-carrying transmission line and, nominally, remotely controlled by a voice frequency control signal transmitted over the same line.

In accordance with the present invention, the above and other objects are attained in an illustrative embodiment by utilizing a frequency modulated control signal having a preselected carrier frequency, modulation frequency and index of modulation. If these characteristics are held within narrow limits, it is virtually impossible to duplicate the control signal by voice or by means of any simple device. These characteristics may then be detected at the controlled station and only signals having all of the necessary characteristics will operate the controlled apparatus.

As is well known, the index of modulation of a frequency modulated signal determines the distribution of energy in the frequency spectrum represented by the carrier and the sidebands of the frequency modulated signal. In further accord with the present invention, the detecting apparatus is arranged to respond only to signals having the energy distribution resulting from the preselected index of modulation. More particularly, one of the sidebands, for example the first lower sideband, may be detected both in frequency and in amplitude. The frequency of this sideband depends both on the carrier wave frequency and the modulating frequency. The amplitude of this sideband depends on the index of modulation of the control signal. If the demodulator is enabled only if both of these quantities fall within the preselected narrow limits, the possibility of erroneous response to random or fraudulent signals is reduced to a great extent. If, in addition to this, the amplitude and the frequency of the modulating wave, as provided by the demodulator output, are also detected and used, the possibility of erroneous response is substantially eliminated.

One feature of the present invention resides in the ease and simplicity with which these control signals may be generated and detected. Since cost and reliability are both related to complexity, it is important that the signaling circuits be made as simple as possible. In a preferred embodiment of the invention to be described, the detecting circuits utilize transistors and other solid state components to provide a simple, compact arrangement which may be entirely energized over the transmission line, thus doing away with the necessity of a local source of power.

These and other objects and features, the nature of the present invention and its various advantages, may be more fully understood upon consideration of the attached drawings and of the following detailed description of the drawings.

Figures 1, 2:
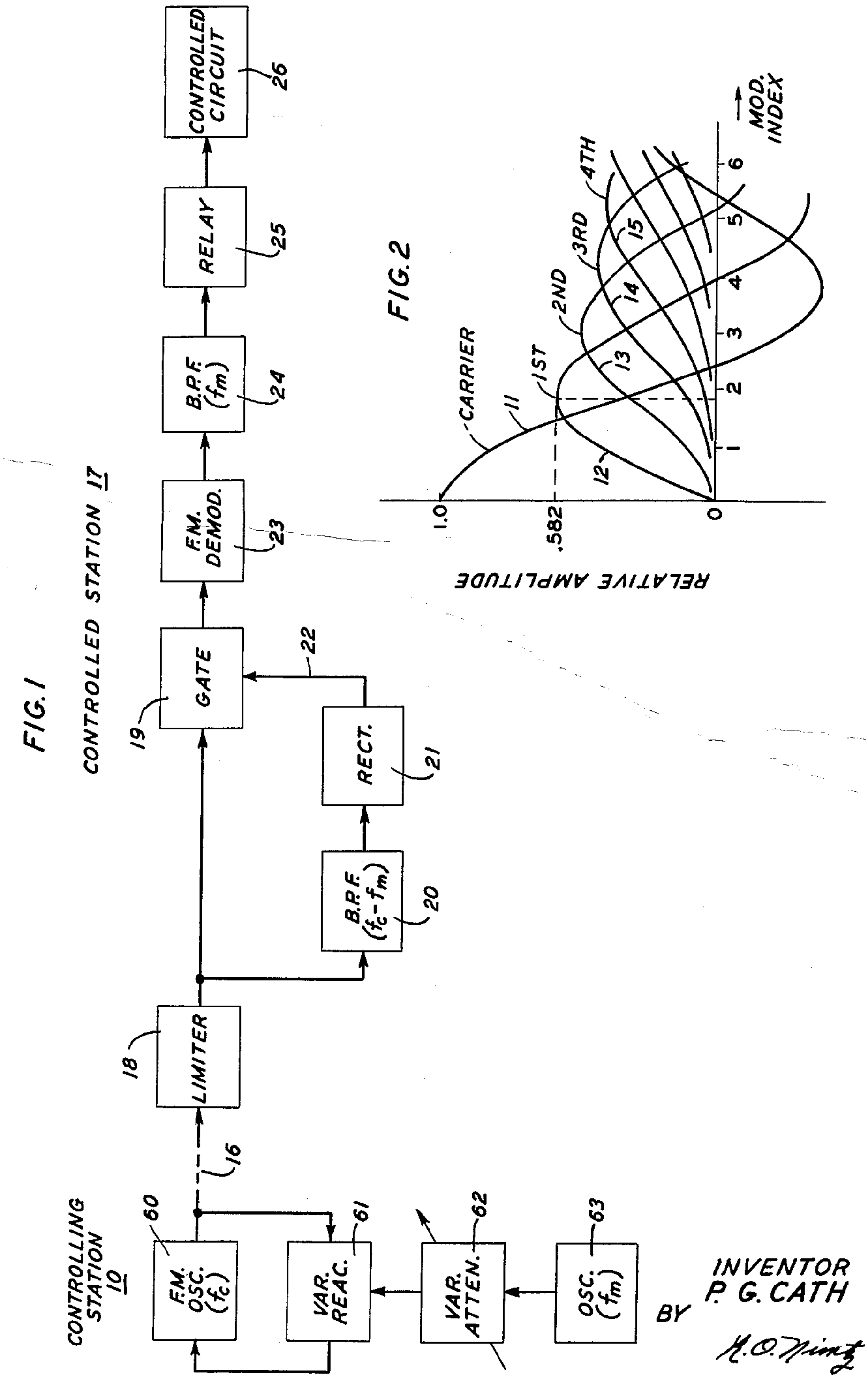
FIG. 1 is a block diagram of a remote control signaling system in accordance with the principles of the invention.
FIG. 2 is a graphical and qualitative representation of the energy distribution in various sidebands of a frequency modulated signal as a function of the index of modulation.

In FIG. 1 there is shown a block diagram of a remote control system comprising a controlling station 10 including a frequency modulated oscillator 60 having a variable reactance element 61 in its feedback path. As is well known, the reactance of element 61 may be varied in accordance with a modulating signal source, oscillator 63. A variable attenuation device 62, is provided to control the amplitude of the modulating frequency and hence the index of modulation of the frequency modulated signal.

In accordance with the present invention, oscillator 60 is adapted to generate and transmit a frequency modulated signal having a fixed carrier frequency $f_c$ modulated by well-known means with a fixed modulating frequency $f_m$. In addition, the signal generated by oscillator 60 has a fixed index of modulation, determined by attenuation device 62, where this index is defined as the ratio between the maximum frequency deviation of the modulated signal and the frequency of the modulating signal. Such oscillators are well known in the art and, since they form no part of the present invention, will not be further described here.

As is well known, the total amount of energy in a frequency modulated signal is constant, provided, of course, the amplitude of the frequency modulated signal remains fixed. The distribution of this energy between the carrier and the sidebands of the frequency modulated signal, however, is a function of the index of modulation. This relationship has been illustrated graphically in FIG. 2.

Thus in FIG. 2 there is shown a graph of the relative amplitudes of the carrier frequency and the sideband frequencies of a frequency modulated wave versus the index of modulation. The carrier amplitude, represented by curve 11, begins at a relative amplitude of unity when the modulation index is zero, that is, the carrier wave is unmodulated. As the index of modulation is increased from zero, the relative amplitude of the carrier falls off while the relative amplitudes of the sidebands increase. Thus curves 12, 13, 14 and 15 represent the relative amplitudes of the first, second, third and fourth sidebands, respectively. It is to be understood that both the upper and the lower sidebands have these relative amplitudes.

In accordance with the present invention, the index of modulation of the frequency modulated wave transmitted from oscillator 60 in FIG. 1 is preselected by device 62 such that the signal can be accurately and uniquely detected by measuring the amplitude of at least one of the sidebands. As an illustrative example, the modulation index may be chosen as approximately 1.85. At this value, the relative amplitude of the first sideband is a maximum, equal to about 0.582 of the unmodulated carrier amplitude, and the carrier and the other sidebands are at relatively low values, less than three-tenths of the unmodulated carrier amplitude. A wave modulated in this way has a first sideband frequency which is relatively simple to detect and has an amplitude easy to distinguish from the other signal components. For the remainder of this description, it will be assumed that the signal generated in oscillator 60 has a modulation index of 1.85. It is apparent from FIG. 2, however, that many other values of modulation index would yield a sideband distribution capable of detection and measurement.

Returning to FIG. 1, oscillator 60 applies a frequency modulated signal having an index of modulation of approximately 1.85 to a transmission medium 16 which is capable of carrying such a wave. Medium 16 is illustrated schematically in FIG. 1 as a single line. It may, however, comprise any suitable transmission medium including a radio link, a voice frequency telephone line, or a portion of a carrier transmission system. In any event, medium 16 connects controlling station 10 with a remote controlled station 17 which is at the location of the specific apparatus which is to be controlled.

Controlled station 17 comprises a limiter 18, which removes any amplitude variations introduced into the signal, for example, by noise and distortion, a gate 19 and a filter 20. Gate 19 is a signal transmission gate which is normally disabled so as to block the limited frequency modulated signal. A signal on lead 22, however, having the proper amplitude, serves to enable gate 19 and allow the frequency modulated signal to pass.

Filter 20 is of the bandpass type having a narrow passband which will pass only the first lower sideband of the frequency modulated signal. This filter therefore passes the frequency $(f_c - f_m)$ and rejects all of the other signal components of the frequency modulated signal. The output of filter 20 is converted to a direct current control voltage by rectifier 21 and applied to lead 22. This direct current control voltage on lead 22 enables gate 19 only if it has a sufficient amplitude to overcome the bias on gate 19. This amplitude, of course, corresponds to the amplitude it should have with the given modulation index of 1.85, that is, 0.582 of the amplitude of the unmodulated carrier.

When gate 19 is enabled by the control voltage on lead 22, the signal from limiter 18 is applied to a demodulator 23 which demodulates the frequency modulated signal to recover the modulating frequency $f_m$. If this modulating frequency is present in the frequency modulated signal, it passes filter 24 and is applied to a relay circuit 25. Relay circuit 25 has a threshold which must be overcome by the signal from filter 24 before it will operate. When so operated, the relay circuit performs the actual control function such as, for example, energizing a controlled circuit 26.

From the above description, it can be seen that circuit 26 will be energized only if the received signal has the proper lower sideband and, furthermore, only if this sideband has the necessary amplitude. Filter 20 serves to detect the sideband frequency; the amplitude of this sideband frequency component must be sufficient to overcome the operate threshold of gate 19. It will be noted, however, that many combinations of $f_c$ and $f_m$ will produce the necessary frequency component to pass filter 20. Filter 24, however, serves to prevent any of these signals from operating relay circuit 25, excepting the one having the desired modulating frequency $f_m$ and, in combination with filter 20, the proper carrier frequency $f_c$. Signals including the frequency component $f_m$ but not the sideband $(f_c - f_m)$ will not operate the circuit because gate 19 will remain disabled. Furthermore, signals including both of the frequency components $f_c$ and $f_m$ will operate the circuit only if these components have the required amplitudes, that is, if the signal has the necessary index of modulation. Amplitude modulated signals are effectively blocked by limiter 18. Since this frequency modulated signal is almost impossible to duplicate, either by chance or intentionally with simple apparatus, a high degree of protection against random or intentional interference is provided.

Figures 3, 4:
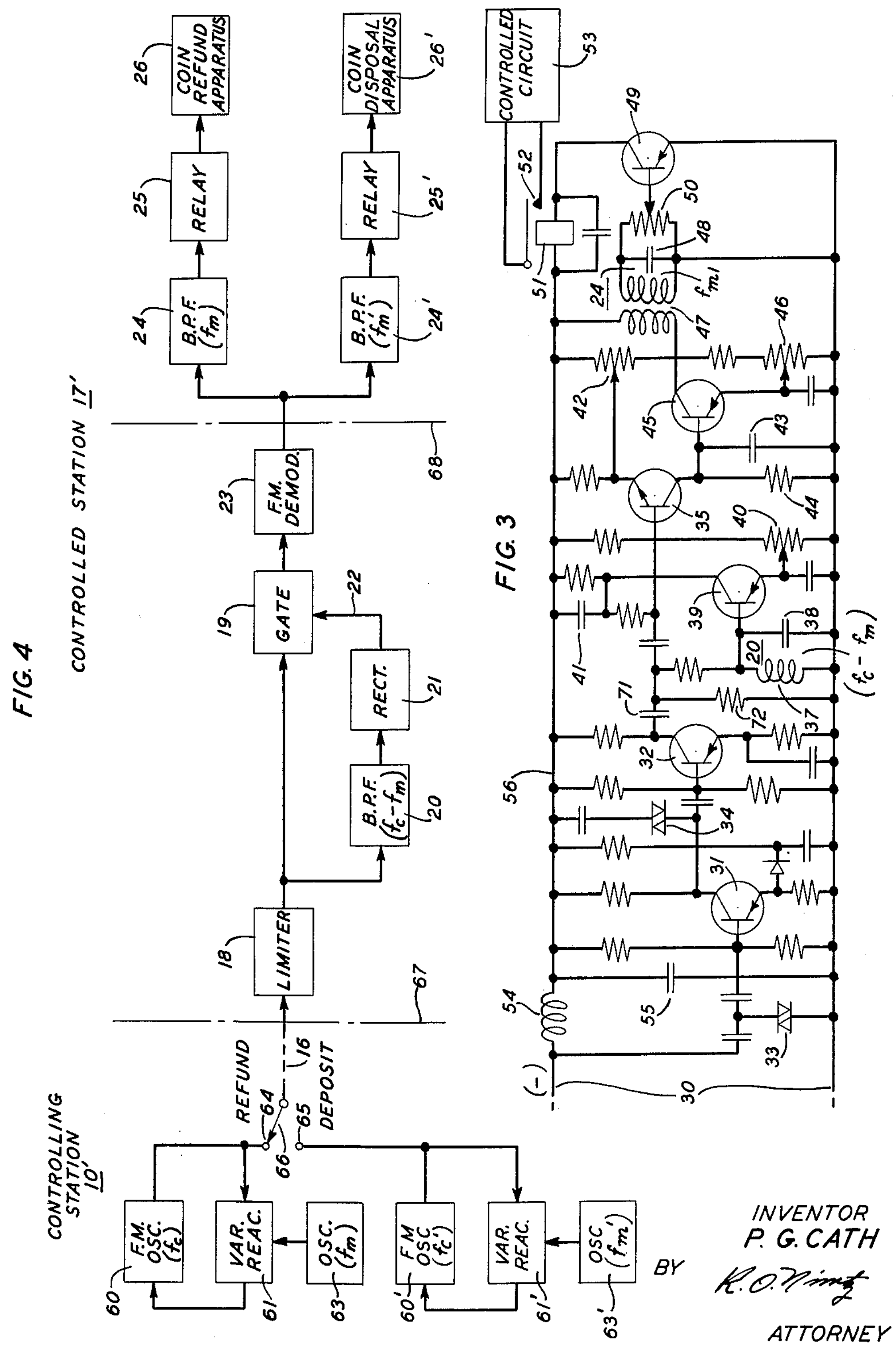
FIG. 3 is a schematic diagram of an all transistor receiving circuit suitable for use in the system of FIG. 1.
FIG. 4 is a circuit modification of FIG. 1 by which the number of functions which may be controlled is increased.

Proceeding to FIG. 3 of the drawings, there is shown a detailed schematic diagram of a circuit suitable for detecting the frequency modulated signaling wave utilized in the arrangement of FIG. 1. The receiving and detecting circuit of FIG. 3 utilizes transistors as the active elements and is powered over the transmission line. It is to be understood, however, that many other elements and circuit configurations would be suitable as embodiments of the present invention.

Proceeding to FIG. 3, signals arriving on transmission line 30 are first limited by varistor 33. This limiting action, however, removes only very large line surges which might damage the semiconductor devices. These partially limited signals are applied to the base of transistor 31.

Transistors 31 and 32, together with associated circuit components, comprise a limiter employing the phenomenon known as "limiter capture" by which the stronger of two signals applied to the limiter determine, at least to a first approximation, its output.

Transistor 31 is so biased as to provide a highly sensitive limiting action, sometimes known as "extreme limiting." That is, an input signal of any significant amplitude whatsoever saturates transistor 31 and produces essentially a square wave output. It can be seen that the power output of transistor 31 is essentially constant since this transistor is normally saturated. The zero crossovers of the output wave, however, are determined by the input waveform. Any input frequency component having more than one-half of the total input power will essentially "capture" the limiter and determine the output frequency. Other frequency components may vary the instantaneous zero crossovers of the dominant frequency, but will not normally produce additional crossovers. For this reason, the transistor limiter 31 will be "captured" by the highest amplitude frequency component of the input wave and will not produce any substantial response to other frequency components such as noise or speech.

Varistor 34, connected to the collector of transistor 31, prevents too large a signal from appearing on the base of transistor 32 and thus shifting its operating point, while at the same time allows transistor 32 to go into saturation on each cycle. A square wave therefore appears on the collector of transistor 32 having essentially the frequency of the highest amplitude input signal. This square wave is simultaneously applied to transistor 35, operated as a gate, and the filter 20, comprising inductor 37 and capacitor 38. The signal across filter 20 is applied to the base of transistor 39. The emitter voltage of transistor 39, determined by the setting of potentiometer 40, is maintained at a value such that transistor 39 does not conduct unless the voltage across filter 20 rises above a preselected value. Transistor 39 rectifies voltages on its base which exceed the threshold set by potentiometer 40.

When conducting, transistor 39 builds up a charge on capacitor 41 which, when it reaches a preselected value, is sufficient to enable transistor 35 to conduct. Before this value is reached, the emitter of transistor 35 is held positive with respect to its base by the setting of potentiometer 42. Only when a signal component having a frequency of $(f_c-f_m)$ and an amplitude sufficient to overcome the bias on the emitter of transistor 39 will transistor 35 be capable of conduction.

The square wave appearing on the collector of transistor 32 is differentiated by capacitor 71 and resistor 72, applied to the base of transistor 35 and causes transistor 35 to conduct on positive half cycles, provided, of course, transistor 35 is enabled by a sufficiently strong signal component at the frequency $(f_c-f_m)$. Each time transistor 35 conducts, a charge is deposited on capacitor 43 in its collector circuit. Capacitor 43 and resistor 44 form a simple smoothing filter across which a voltage appears including a direct current component and an alternating current component. The alternating current component is the modulating frequency $f_m$ while the direct current component is a measure of the carrier frequency $f_c$. These components are applied to the base of transistor 45.

The emitter of transistor 45 is held at a preselected voltage by potentiometer 46. Only when the direct current component across capacitor 43, a function of the carrier frequency, is of a proper magnitude will the base of transistor 45 be less negative than its emitter. When the carrier frequency does have the desired amplitude, transistor 45 is enabled and amplifies the alternating current component across capacitor 43, applying this amplified signal to transformer 47.

The secondary winding of transformer 47, together with capacitor 48, forms a filter 24 tuned to the desired modulating signal $f_m$. A transistor 49 is turned on only if the signal across filter 54 is of sufficient magnitude as determined by the setting of potentiometer 50. When transistor 49 is thus enabled, current flows through a relay winding 51 in its emitter circuit, causing the relay to operate and close contacts 52. Contacts 52 may be connected so as to energize circuit 53 by their closure.

It can be seen that the circuit of FIG. 3 serves to measure the carrier frequency, modulation frequency and, in effect, the index of modulation of an incoming signal. Only if these three quantities, as determined by filters 20 and 24 and potentiometers 40, 46 and 50, are within prescribed limits will relay 51 be operated to energize circuit 53. For this reason, the circuit of FIG. 3 provides a high degree of protection against erroneous responses to random or intentional interference.

It will be further noted that all of the active elements in FIG. 3 may be powered directly from transmission line 30. To this end, inductor 54 and capacitor 55 form a low-pass filter to pass direct current to power supply bus 56 while effectively blocking signal frequency components. This feature is particularly important in telephone systems where it is difficult to obtain local power.

In one illustrative example, the circuits heretofore described may be used to control the refund and deposit of coins at pay telephone stations. In this application, transmission line 30 might comprise a conventional voice frequency telephone line used normally for speech but also suitable for signaling purposes. A frequency modulated signal in the voice frequency range, for example a one thousand cycle carrier frequency modulated with a one hundred cycle modulating frequency, might be applied to line 30. Filter 20 would then be tuned to the first lower sideband, namely, nine hundred cycles per second, and filter 24 to the modulating frequency of one hundred cycles per second.

In order to control pay telephone stations, however, it is normally necessary to provide at least two separate and independent controls, one to initiate the collection of deposits and another to initiate a refund. The circuit of FIG. 1 is, of course, capable of performing either one of these operations. In a pay telephone system, however, it is desirable that both of these operations be performed with as simple and reliable circuit arrangements as possible. In accordance with the present invention, the circuit of FIG. 1 may be modified in the manner shown in FIG. 4 in order to accommodate two separate control functions.

Thus in FIG. 4 there is shown a circuit arrangement by which two separate and independent control operations may be accommodated. The circuit of FIG. 4 is identical to that of FIG. 1 except for the inclusion of a second signal source and a second modulating frequency filter, relay and controlled circuit. Controlling station 10′, which may be a central office in a pay telephone system, comprises a first frequency modulated oscillator 60, a first variable reactance element 61 and a first modulating frequency oscillator 63 just as does controlling station 10 in FIG. 1. The controlling station 10′ of FIG. 4 also includes a second frequency modulated oscillator 60′, a second variable reactance element 61′ and a second modulating frequency oscillator 63′. The variable attenuation elements have been omitted in FIG. 4 for convenience, but it is to be understood that the modulation index of each frequency modulated signal is preselected as before, for example, 1.85 in the illustrative embodiment.

The frequencies $f_c$, $f_c'$, $f_m$ and $f_m'$ are chosen such that $$f_c'-f_m'=f_c-f_m$$

In this case the two signals from oscillator 60 and oscillator 60′ have the same lower sideband frequency, although the carrier frequencies $f_c$ and $f_c'$ are different and the modulating frequencies $f_m$ and $f_m'$ are also different.

A switch 66 is provided at controlling station 10′ to alternatively connect medium 16 to contacts 64 and 65, respectively. Thus, either the output of oscillator 60 is applied to medium 16 or the output of oscillator 60′. In this way, an operator at the controlling station 10′ may select the control signal to be sent and thus secure the performance of one of two alternative operations.

The remote controlled station 17′, which may comprise a remote substation in a pay telephone system, is identical to station 17 in FIG. 1 but for the addition of certain signal responsive elements. Thus, the portion of controlled station 17′ between dashed lines 67 and 68 is identical to the corresponding portion of FIG. 1 and has therefore been shown with the same reference numerals. Connected to demodulator 23, however, there are two bandpass filters 24 and 24′. Filter 24 passes the frequency component $f_m$ while filter 24′ passes $f_m'$. As described above, these frequencies originate in oscillators 63 and 63′ respectively, in controlling station 10′.

Connected to filter 24 is a relay 25 which operates when the output of filter 24 is of sufficient amplitude to overcome a threshold bias. When operated, relay 25 performs a first control function, such as refunding coins in a coin-operated telephone station.

Also connected to demodulator 23 is a second bandpass filter 24' which serves to pass the frequency component $f_m'$. When this frequency component is present with a sufficient amplitude, relay 25' operates and performs a second control function, such as depositing coins in a coin-operated telephone station.

In order for the frequency component $f_m'$ to reach filter 24', it is necessary that gate 19 be enabled by the first lower sideband of the received signal. That is, the received signal must include a frequency component of $(f_c-f_m)$ at the proper amplitude. Since $f_m'$ must be different from $f_m$, a carrier frequency $f_c'$ must be utilized which will produce the same lower sideband. That is, $$f_c'-f_m'=f_c-f_m$$

In the illustrative example, where $f_c$ was one thousand cycles and $f_m$ was one hundred cycles, the difference was nine hundred cycles. If $f_m'$ is chosen as one hundred and fifty cycles, a carrier frequency $f_c'$ of one thousand and fifty cycles would produce the desired nine hundred cycle first lower sideband. It is to be understood, however, that the one thousand and fifty cycle carrier modulated with a one hundred and fifty cycle wave must also have the required index of modulation, 1.85. With any other index of modulation, the amplitude of the nine hundred cycle first lower sideband would not be sufficient to enable gate 19.

It can be seen that the overall arrangement of FIG. 4 is capable of accommodating two separate and independent control signals to energize two different circuits, 26 and 26'. The bulk of the circuit of FIG. 4, however, is used in common by both of these control signal paths. For this reason, the amount of circuitry required per control signal is greatly reduced.

Just as the circuit of FIG. 4 was used to double the number of control functions accommodated, so also may other similar circuits be added to further increase the number of control functions. Even in a relatively narrow band system such as a telephone system, a large number of circuits could be separately controlled. It is only necessary in each case that the control signal include a first lower sideband having a frequency equal to $(f_c-f_m)$ and an amplitude equal to 0.582 times the unmodulated carrier amplitude.

It is to be understood that the above-described arrangements are merely illustrative of the numerous and varied other arrangements which would represent applications of the principles of the invention. Such other arrangements may readily be devised by those skilled in the art without departing from the spirit and scope of the invention.

What is claimed is:

1. In a selective signaling system, a transmisison line, a source of signaling current for producing on said line a frequency modulated signaling wave having a preselected modulation index, and a signal receiving circuit connected to said line for responding only to said signaling wave, said receiving circuit comprising normally disabled demodulating means, means for detecting at least one sideband of said signaling wave, first threshold responsive means for enabling said demodulating means only when the output of said detecting means exceeds a first threshold, filter means connected to said demodulating means, and second threshold responsive means for responding only when the output of said filter means exceeds a second threshold.

2. A signaling system comprising a central station, a remote controlled station, signal transmitting means at said central station for transmitting a frequency modulated signaling wave having a preselected index of modulation to said controlled station, means at said controlled station for detecting the index of modulation of said signaling wave, and means at said controlled station operative only in response to the detection of said preselected index of modulation.

3. The signaling system according to claim 2 wherein said detecting means comprises means for selecting at least one sideband frequency component of said signaling wave, means for measuring the amplitude of said sideband frequency component, means for selecting at least one modulating frequency component of said signaling wave, and means for measuring the amplitude of said modulating frequency component.

4. In a selective signaling system, a controlling station, a controlled station, means at said controlling station for selectively transmitting a plurality of frequency modulated signaling waves each having a preselected index of modulation and each having at least one given sideband frequency component but having different modulating frequencies, means at said controlled station for detecting said signaling waves, and means selectively operative in accordance with the particular modulating frequency detected.

5. The combination according to claim 4 in which said transmitting means includes means for modulating a plurality of carrier frequencies with modulating frequencies each producing the same given lower sideband frequency component.

6. The combination according to claim 5 in which said transmitting means includes means for generating frequency modulated signaling waves having an index of modulation substantially equal to 1.85.

7. A telephone system having a central office and remote pay stations comprising, signal transmitting means at said central office for transmitting control signals to said pay stations, said control signals comprising frequency modulated waves having preselected indices of modulation, carrier frequencies and modulating frequencies, means at said pay stations for detecting said indices of modulation, carrier frequencies and modulating frequencies, and means controlled by said detecting means for operating coin disposal equipment in accordance with the particular characteristics detected.

8. The telephone system according to claim 7 wherein said detecting means comprises normally disabled demodulating means, means for selecting at least one sideband frequency of said frequency modulated waves, threshold means for enabling said demodulating means in response to a preselected amplitude of said sideband frequency, means for selecting said modulating frequency, and threshold means responsive to a preselected amplitude of said modulating frequency.

9. The telephone system according to claim 8 wherein said detecting means further includes extreme limiting means.

10. A telephone system including a central office and remote pay stations comprising, means at said central office for selectively transmitting one of a plurality of frequency modulated control signals, each of said control signals having the same first lower sideband frequency and the same modulation index but different carrier and modulating frequencies, means at said pay stations for detecting each of said control signals, and means at said pay stations selectively responsive to said control signals for operating pay station equipment in accordance with the particular carrier and modulating frequencies detected.

11. The telephone system according to claim 10 wherein said detecting means comprises means for selecting said lower sideband frequency component, means for measuring the amplitude of said lower sideband frequency component, demodulating means operative only if said sideband amplitude exceeds a first preselected threshold to demodulate said control signals, means for selecting the modulating frequency components from the output of said demodulating means, means for measuring the amplitudes of said modulating frequency components, and means for selectively energizing said equipment operating means in response to the particular modulating frequency so selected only if said modulating frequency amplitude exceeds a second preselected threshold.

12. The telephone system according to claim 10 wherein said transmitting means includes means for generating frequency modulating control signals having an index of modulation substantially equal to 1.85.

13. The telephone system according to claim 10 further including voice transmission lines interconnecting said central office and said pay stations, and means for energizing said detecting means from said central office over said lines.

14. The telephone system according to claim 11 wherein said detecting means further includes sensitive amplitude limiting means.

References Cited in the file of this patent

UNITED STATES PATENTS

| | | |
|---|---|---|
| 2,535,104 | Van Mierlo | Dec. 26, 1950 |
| 2,817,709 | Alexandersson | Dec. 24, 1957 |

FOREIGN PATENTS

| | | |
|---|---|---|
| 670,703 | Great Britain | Nov. 25, 1948 |

OTHER REFERENCES

Experiments in Electronic and Communications Engineering (Shulz), 2d edition, published by Harper (p. 292 relied on).